United States Patent
Kim

(10) Patent No.: US 9,915,322 B2
(45) Date of Patent: *Mar. 13, 2018

(54) EIGHT-SPEED POWERTRAIN OF AUTOMATIC TRANSMISSION FOR VEHICLE

(71) Applicant: HYUNDAI-POWERTECH CO., LTD., Chungcheongnam-Do (KR)

(72) Inventor: Tae Hoon Kim, Gyeonggi-Do (KR)

(73) Assignee: Hyundai-Powertech Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/655,462

(22) PCT Filed: Jan. 23, 2013

(86) PCT No.: PCT/KR2013/000540
§ 371 (c)(1),
(2) Date: Jun. 25, 2015

(87) PCT Pub. No.: WO2014/104464
PCT Pub. Date: Jul. 3, 2014

(65) Prior Publication Data
US 2016/0195171 A1    Jul. 7, 2016

(30) Foreign Application Priority Data
Dec. 28, 2012 (KR) .......................... 10-2012-0156121

(51) Int. Cl.
*F16H 3/66* (2006.01)

(52) U.S. Cl.
CPC .............. *F16H 3/666* (2013.01); *F16H 3/66* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS 7,980,985 B2 * 7/2011 Seo .................. F16H 3/666
                                                475/275
8,052,566 B2 * 11/2011 Wittkopp ............ F16H 3/66
                                                475/275

(Continued)

FOREIGN PATENT DOCUMENTS

CN         101358635 A    2/2009
DE      102009047274 A1    6/2011

(Continued)

OTHER PUBLICATIONS

Chinese Office Action for Application No. 2013800684673 dated Sep. 30, 2016.

(Continued)

*Primary Examiner* — Colby M Hansen
(74) *Attorney, Agent, or Firm* — Tarolli, Sundheim, Covell & Tummino LLP

(57) ABSTRACT

Disclosed herein is an eight-speed powertrain of a vehicle automatic transmission, including first, second, third, and fourth planetary gear sets, each having a plurality of operational elements, an input shaft connected to a second planetary carrier while power of a vehicle engine is input to the input shaft, an output shaft connected to a fourth ring gear while varied torque is output from the output shaft, a plurality of rotary shafts interconnecting the operational elements, a plurality of brakes, and a plurality of clutches selectively connecting the rotary shafts.

13 Claims, 4 Drawing Sheets

(56) References Cited

U.S. PATENT DOCUMENTS

| | | | |
|---|---|---|---|
| 8,333,676 B2 * | 12/2012 | Kim | F16H 3/666 475/277 |
| 8,435,151 B2 * | 5/2013 | Seo | F16H 3/666 475/271 |
| 9,194,463 B2 * | 11/2015 | Kim | F16H 3/666 |
| 9,279,479 B1 * | 3/2016 | Hwang | F16H 3/66 |
| 9,322,460 B1 * | 4/2016 | Ji | F16H 3/66 |
| 9,429,215 B2 * | 8/2016 | Noh | F16H 3/66 |
| 2011/0245027 A1 | 10/2011 | Wittkopp et al. | |
| 2011/0263376 A1 | 10/2011 | Kamm et al. | |
| 2013/0210570 A1 * | 8/2013 | Mellet | F16H 3/66 475/275 |

FOREIGN PATENT DOCUMENTS

| | | |
|---|---|---|
| JP | 2004360771 A | 12/2004 |
| JP | 2012-225506 A | 11/2012 |
| KR | 100793883 B1 | 1/2008 |
| KR | 100903341 B1 | 6/2009 |
| KR | 101209750 B1 | 12/2012 |
| KR | 1020120132022 A | 12/2012 |

OTHER PUBLICATIONS

International Search Report for PCT/KR2013/000540, dated Jun. 24, 2013, pp. 1-4.

* cited by examiner

Fig. 2

|  | C1 | C2 | C3 | B1 | B2 |
|---|---|---|---|---|---|
| 1st |  |  | ● | ● | ● |
| 2nd |  | ● |  | ● | ● |
| 3rd |  | ● | ● |  | ● |
| 4th | ● | ● |  |  | ● |
| 5th | ● |  | ● |  | ● |
| 6th | ● | ● | ● |  |  |
| 7th | ● |  | ● | ● |  |
| 8th | ● | ● |  | ● |  |
| Rev | ● |  |  | ● | ● | ively connecting the fifth and seventh rotary shafts, and a third clutch selectively connecting the third and fourth rotary shafts, and the at least one clutch may be the third clutch.

EIGHT-SPEED POWERTRAIN OF AUTOMATIC TRANSMISSION FOR VEHICLE

RELATED APPLICATIONS

The present invention is a U.S. National Stage under 35 USC 371 patent application, claiming priority to Serial No. PCT/KR2013/000540, filed on 23 Jan. 2013; which claims priority from KR 10-2012-0156121, filed 28 Dec. 2012, the entirety of both of which are incorporated herein by reference.

TECHNICAL FIELD

The present invention relates to a powertrain of a vehicle automatic transmission, and more particularly, to an eight-speed powertrain of a vehicle automatic transmission.

BACKGROUND ART

In general, a multi-stage gear shift mechanism of an automatic transmission is implemented by combining a plurality of planetary gear sets. A powertrain having the combined planetary gear sets serves to vary torque input from a torque converter and transfer the varied torque to an output shaft.

The more the automatic transmission has implementable gear shift stages, the better a gear ratio may be properly designed and power performance and fuel efficiency may be enhanced. Therefore, a research for implementation of more gear shift stages has been continuously carried out.

Durability, power transfer efficiency, size, and the like of the powertrain are varied according to combination of the planetary gear sets, even though the same gear shift stage is implemented. Therefore, a research for a compact powertrain having high strength and less power loss is ongoing.

Particularly, for a manual transmission, many gear shift stages cause a driver the inconvenience of frequently changing speed. However, for an automatic transmission, a control unit performs gear shift by controlling the operation of the power train according to a driving state. Therefore, a research for the powertrain capable of implementing more gear shift stages has been continuously carried out.

In recent years, a six-speed automatic transmission is developed to be applied to the vehicle, and an eight-speed or more automatic transmission has been actively developed to realize higher fuel efficiency.

The eight-speed or more automatic transmission is mainly developed such that three planetary gear sets or four planetary gear sets are combined with a plurality of clutches and brakes. However, it is difficult to secure a space for arrangement of the clutches since all of the clutches are intensively provided at a rear end of the transmission. Accordingly, there are problems in that the whole length of the transmission is increased according to the intensive arrangement of the clutches and passages for implementation of the clutches are complicatedly designed since the clutches are intensively provided at the rear end of the transmission.

Meanwhile, the eight-speed or more automatic transmission is configured such that an output shaft is typically provided to the rear end of the transmission. This configuration in which the output shaft is provided to the rear end of the transmission has an adverse effect on vibration and noise characteristics of the transmission itself, and particularly, is undesirable for a front-wheel-drive vehicle.

DISCLOSURE

Technical Problem

Accordingly, the present invention has been made in view of the above-mentioned problem, and an object thereof is to provide an eight-speed powertrain of a vehicle automatic transmission, capable of having an advantage in terms of space utilization, of reducing a whole length of a transmission, and of simply designing passages for a plurality of clutches, by means of distributed arrangement of the clutches.

In addition, another object of the present invention is to provide an eight-speed powertrain of a vehicle automatic transmission, capable of having improved noise and vibration characteristics and structure suitable for a front-wheel-drive vehicle, by arranging output ends in proximity to a front end portion of a transmission instead of a rear end portion thereof.

Technical Solution

In accordance with an aspect of the present invention, an eight-speed powertrain of a vehicle automatic transmission, includes a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, an input shaft connected to the second planetary carrier while power of a vehicle engine is input to the input shaft, an output shaft connected to the fourth ring gear while varied torque is output from the output shaft, a first rotary shaft connected to the first and second sun gears and at the same time selectively connected to a transmission case, a second rotary shaft connected to the first ring gear and at the same time selectively connected to the transmission case, a third rotary shaft connected to the second planetary carrier, a fourth rotary shaft connected to the third sun gear and at the same time selectively connected to the third rotary shaft, a fifth rotary shaft connected to the second ring gear, a sixth rotary shaft connected to the third planetary carrier and at the same time selectively connected to the fifth rotary shaft, a seventh rotary shaft connected to the third sun gear and at the same time selectively connected to the fifth rotary shaft, a plurality of brakes selectively connecting the first rotary shaft to the transmission case and the second rotary shaft to the transmission case, respectively, and a plurality of clutches selectively connecting the third and fourth rotary shafts, the fifth and sixth rotary shafts, and the fifth and seventh rotary shafts, respectively, wherein at least one of the clutches is spatially spaced apart from another clutch, so that the second, third, and fourth planetary gear sets are provided within a space between the at least one clutch and the other clutch.

The first, second, third, and fourth planetary gear sets may be arranged in order of the first planetary gear set, the second planetary gear set, the fourth planetary gear set, and the third planetary gear set.

The clutches may include a first clutch selectively connecting the fifth and sixth rotary shafts, a second clutch selectively connecting the fifth and seventh rotary shafts, and a third clutch selectively connecting the third and fourth rotary shafts, and the at least one clutch may be the third clutch.

The first and second clutches may be spatially arranged in the rear of the third planetary gear set, and the third clutch may be spatially arranged between the first and second planetary gear sets.

The first sun gear may rotate integrally with the second sun gear. The first and second sun gears may be formed as a single integral member.

The third ring gear may rotate integrally with the fourth planetary carrier. The third ring gear and the fourth planetary carrier may be formed as a single integral member.

The third planetary carrier may rotate integrally with the fourth sun gear. The third planetary carrier and the fourth sun gear may be formed as a single integral member.

The first planetary carrier may rotate integrally with the fourth planetary carrier. The first planetary carrier and the fourth planetary carrier may be formed as a single integral member.

The third planetary gear set may have a double pinion structure.

Advantageous Effects

An eight-speed powertrain of a vehicle automatic transmission according to the present invention can have an advantage in terms of space utilization, reduce a whole length of a transmission, and simply design passages for a plurality of clutches, by means of distributed arrangement of the clutches.

In addition, the eight-speed powertrain of a vehicle automatic transmission according to the present invention can have improved noise and vibration characteristics and structure suitable for a front-wheel-drive vehicle, by arranging output ends in proximity to a front end portion of a transmission.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which:

FIG. 2 is an operation chart of the eight-speed powertrain of a vehicle automatic transmission according to the embodiment of the present invention;

BEST MODE FOR INVENTION

Figure 1:
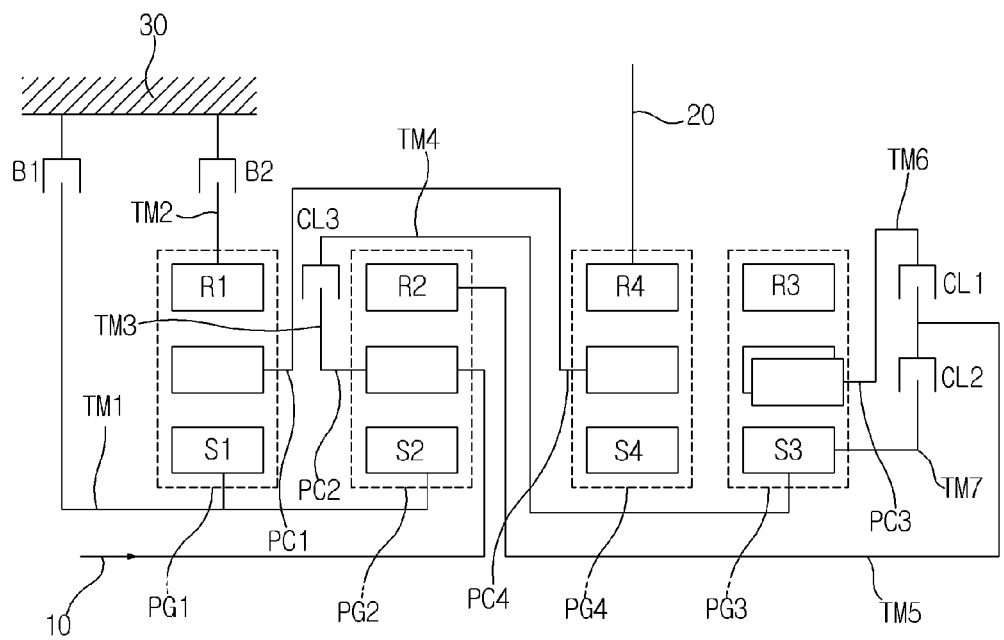
FIG. 1 is a diagram illustrating a configuration of an eight-speed powertrain of a vehicle automatic transmission according to an embodiment of the present invention.

Reference will now be made in detail to embodiments of the present invention, examples of which are illustrated in the accompanying drawings.

Various variations may be performed on the exemplary embodiments according to the concept of the present invention and the embodiments of the present invention can be realized in a wide range of varied forms, and thus specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

The terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The terminology used in the specification of the present invention is for the purpose of describing particular embodiments only and is not intended to limit the invention. As used in the specification and the appended claims, the singular forms "a", "an" and "the" are intended to include the plural forms as well, unless context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, the following embodiments are provided so that this disclosure will be thorough and complete, and will fully convey the concept of the invention to those skilled in the art. The drawings are not necessarily to scale and in some instances, proportions may have been exaggerated in order to clearly illustrate features of the embodiments.

FIG. 1 is a diagram illustrating a configuration of an eight-speed powertrain of a vehicle automatic transmission according to an embodiment of the present invention.

Referring to FIG. 1, the eight-speed powertrain of a vehicle automatic transmission according to the embodiment of the present invention includes first, second, third, and fourth planetary gear sets PG1, PG2, PG3, and PG4, each having a plurality of operational elements, an input shaft 10 connected to a second planetary carrier PC2 while power of a vehicle engine is input to the input shaft 10, an output shaft 20 connected to a fourth ring gear R4 while varied torque is output from the output shaft 20, a plurality of rotary shafts TM1, TM2, TM3, TM4, TM5, TM6, and TM7 interconnecting the operational elements, a plurality of brakes B1 and B2, and a plurality of clutches CL1, CL2, and CL3 selectively connecting the rotary shafts. Here, the rotary shafts are configured of at least first, second, third, fourth, fifth, sixth, and seventh rotary shafts TM1, TM2, TM3, TM4, TM5, TM6, and TM7, the third planetary gear set PG3 has a double pinion structure, and each of the first, second, and fourth planetary gear sets PG1, PG2, and PG4 has a single pinion structure.

The input shaft 10 is an input member and means a turbine shaft of a torque converter. The power of the engine is input from a crankshaft to the input shaft 10 while being converted into torque by the torque converter, and the converted torque is input to the second planetary carrier PC2.

The output shaft 20 is an output member for outputting the varied torque and is connected to the fourth ring gear R4. The output shaft 20 actuates drive wheels through the known differential gearing.

The first planetary gear set PG1 includes at least three operational elements configured of a first sun gear S1, a first ring gear R1, and a first planetary carrier PC1.

The first sun gear S1 is connected to the first rotary shaft TM1 and the first rotary shaft TM1 is selectively connected to a transmission case 30 through a first brake B1.

The first ring gear R1 is connected to the second rotary shaft TM2, and the second rotary shaft TM2 is selectively connected to the transmission case 30 through a second brake B2.

The first planetary carrier PC1 interconnects a plurality of single pinions engaged between the first sun gear S1 and the first ring gear R1 and is connected to a fourth planetary carrier PC4 to be described later so as to rotate integrally therewith.

The second planetary gear set PG2 includes at least three operational elements configured of a second sun gear S2, a second ring gear R2, and a second planetary carrier PC2.

The second sun gear S2 is connected to the first rotary shaft TM1, and the first rotary shaft TM1 is selectively connected to the transmission case 30 through the first brake B1, similarly to the case of the first sun gear S1. Here, the first sun gear S1 is connected to the second sun gear S2 so as to rotate integrally therewith.

The second planetary carrier PC2 interconnects a plurality of single pinions engaged between the second sun gear S2 and the second ring gear R2. The second planetary carrier PC2 is connected to the input shaft 10 to receive the power of the vehicle engine and is simultaneously connected to the third rotary shaft TM3. The third rotary shaft TM3 is selectively connected to the fourth rotary shaft TM4, which is connected to a third sun gear S3 to be described later, through a third clutch CL3.

The second ring gear R2 is connected to the fifth rotary shaft TM5, and the fifth rotary shaft TM5 is selectively connected to the sixth rotary shaft TM6, which is connected to a third planetary carrier PC3 to be described later, through a first clutch CL1. In addition, the fifth rotary shaft TM5 is selectively connected to the seventh rotary shaft TM7, which is connected to the third sun gear S3, through a second clutch CL2.

The third planetary gear set PG3 may have a double pinion structure and includes at least three operational elements configured of a third sun gear S3, a third ring gear R3, and a third planetary carrier PC3.

As described above, the third sun gear S3 is connected to the fourth and seventh rotary shafts TM4 and TM7, the fourth rotary shaft TM4 is selectively connected to the third rotary shaft TM3, which is connected to the second planetary carrier PC2, through the third clutch CL3, and the seventh rotary shaft TM7 is selectively connected to the fifth rotary shaft TM5, which is connected to the second ring gear R2, through the second clutch CL2.

The third ring gear R3 is connected to the fourth planetary carrier PC4 so as to rotate integrally therewith.

The third planetary carrier PC3 is connected to a fourth sun gear S4 so as to rotate integrally therewith and is simultaneously connected the sixth rotary shaft TM6. The third planetary carrier PC3 is selectively connected to the fifth rotary shaft TM5, which is connected to the second ring gear R2, through the first clutch CL1.

The fourth planetary gear set PG4 includes at least three operational elements configured of a fourth sun gear S4, a fourth ring gear R4, and a fourth planetary carrier PC4.

The fourth sun gear S4 is connected to the third planetary carrier PC3 of the third planetary gear set PG3 so as to rotate integrally therewith.

As described above, the fourth ring gear R4 is connected to the output shaft 20 for outputting the varied torque.

The fourth planetary carrier PC4 is connected to the first planetary carrier PC1 and the third ring gear R3 so as to rotate integrally therewith.

The planetary gear sets having the above-mentioned configurations are arranged in order of the first planetary gear set PG1, the second planetary gear set PG2, the fourth planetary gear set PG4, and the third planetary gear set PG3 toward the rear of the transmission from the front thereof. Through such arrangement, the transmission may be suitable for a front-wheel-drive vehicle. In addition, since output ends are arranged at a rear end of the transmission, generation of vibration and noise may be reduced.

Meanwhile, at least one, preferably the third clutch CL3, of the first, second, third clutches CL1, CL2, and CL3 according to the embodiment of the present invention, is spatially spaced apart from the first and second clutches CL1 and CL2.

In more detail, the third clutch CL3 for selectively connecting the third and fourth rotary shafts TM3 and TM4 is arranged at the front of the transmission, namely, between the first and second planetary gear sets PG1 and PG2. The first clutch CL1 for selectively connecting the fifth and sixth rotary shafts TM5 and TM6 and the second clutch CL2 for selectively connecting the fifth and seventh rotary shafts TM5 and TM7 are arranged at the rear of the transmission, namely, at the rear of the third planetary gear set PG3. Accordingly, the second, third, and fourth planetary gear sets PG2, PG3, and PG4 are provided within a space between the third clutch CL3 and the first and second clutches CL1 and CL2.

Through distributed arrangement of the clutches CL1, CL2, and CL3 in the transmission, the whole length of the transmission itself may be reduced and thus the space in which the transmission is mounted may be usefully employed.

In addition, each of the first, second, and third clutches CL1, CL2, and CL3 is a multi-plate hydraulic friction coupling unit which is typically applied to the transmission. Accordingly, through distributed arrangement of the clutches, a passage for supplying hydraulic pressure to each clutch may be simply designed compared to the related art.

Figure 3:
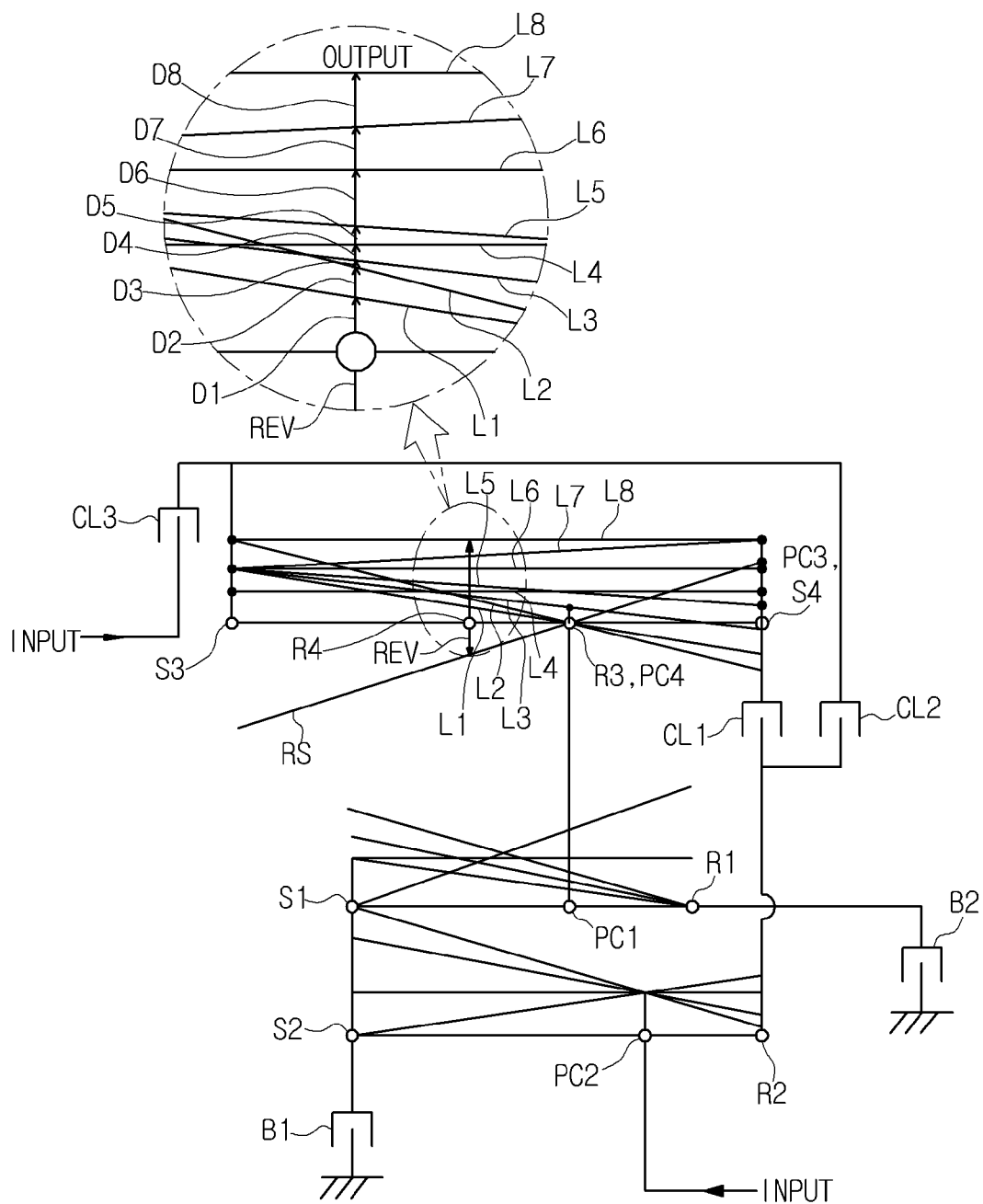
FIG. 3 is a shift diagram of the eight-speed powertrain of a vehicle automatic transmission according to the embodiment of the present invention.

FIG. 2 is an operation chart illustrating friction elements applied to the eight-speed powertrain of a vehicle automatic transmission according to the embodiment of the present invention. FIG. 3 is a shift diagram of the eight-speed powertrain of a vehicle automatic transmission according to the embodiment of the present invention.

Referring to FIGS. 2 and 3, the eight-speed powertrain of a vehicle automatic transmission according to the embodiment of the present invention performs gear shift while two brakes and three clutches as friction elements are operated. "[●]" shown in the drawing indicates an operated state and the gear shift is performed while two or three friction elements are operated in each gear shift stage. As illustrated in FIG. 3, it may be seen that a gear ratio implemented in each gear shift stage is obtained by depicting an input/output speed ratio corresponding to the rotation speed of each friction element.

First, in a forward first speed D1, the third clutch CL3, the first brake B1, and the second brake B2 are operatively controlled.

Accordingly, the torque of the input shaft 10 is input to the second planetary carrier PC2, and the torque of the second planetary carrier PC2 is transferred to the third sun gear S3 through the third clutch CL3. In this case, since the fourth planetary carrier PC4 and the third ring gear R3 are operated as fixed elements, the third planetary carrier PC3 is operated as an output element of the third planetary gear set PG3 and the fourth sun gear S4 connected to the third planetary carrier PC3 is operated as input element of the fourth planetary gear set PG4. Consequently, a first speed line L1 is defined and a gear ratio of the first speed D1 is transferred to the output shaft 20 through the fourth ring gear R4.

In a forward second speed D2, the third clutch CL3 operated in the forward first speed D1 is released and the second clutch CL2 is operated. In this case, since the first and second sun gears S1 and S2 and the first ring gear R1 are respectively fixed by the first brake B1 and the second brake B2, the first planetary gear set PG1 configured of the first sun gear S1, the first planetary carrier PC1, and the first ring gear R1 is in a fixed state. In this case, the torque of the input shaft 10 is input through the second planetary carrier PC2 of the second planetary gear set PG2 connected to the input shaft 10, and the torque output from the second ring gear R2 of the second planetary gear set PG2 is transferred to the third sun gear S3 of the third planetary gear set PG3. Accordingly, the third planetary carrier PC3 is operated as an output element and the fourth sun gear S4 connected to the third planetary carrier PC3 is operated as an input element. Consequently, a second speed line L2 is defined and a gear ratio of the second speed D2 is transferred to the output shaft 20 through the fourth ring gear R4.

In a forward third speed D3, the first brake B1 operated in the forward second speed D2 is released and the third clutch CL3 is operated. In this case, both of the second sun gear S2 and the second ring gear R2 are in a rotation state through rotation of the second planetary carrier PC2 by the torque transferred from the input shaft 10, so that the elements of the second planetary gear set PG2 are integrally rotated. In addition, since the first ring gear R1 is operated as a fixed element by the second brake B2, the torque transferred through the first sun gear S1 is transferred to the fourth planetary carrier PC4. In this case, a third speed line L3 is defined by the third ring gear R3 and the fourth planetary carrier PC4 via the third sun gear S3 rotated at the same speed as the second planetary gear set PG2, and a gear ratio of the third speed D3 is transferred to the output shaft 20 through the fourth ring gear R4.

In a forward fourth speed D4, the third clutch CL3 operated in the forward third speed D3 is released and the first clutch CL1 is operated. In this case, since the first ring gear R1 is operated as a fixed element by the second brake B2, the torque transferred through the second planetary carrier PC2 from the input shaft 10 is decreased through the second ring gear R2 to be transferred to the third and fourth sun gears S3 and S4. Consequently, a fourth speed line L4 is defined and a gear ratio of the fourth speed D4 is transferred to the output shaft 20 through the fourth ring gear R4.

In a forward fifth speed D5, the second clutch CL2 operated in the forward fourth speed D4 is released and the third clutch CL3 is operated. In this case, since the first ring gear R1 is operated as a fixed element by the second brake B2, the torque transferred through the second planetary carrier PC2 from the input shaft 10 is transferred to the third sun gear S3 and the torque decreased through the second ring gear R2 is input to the fourth sun gear S4. Consequently, a fifth speed line L5 is defined and a gear ratio of the fifth speed D5 is transferred to the output shaft 20 through the fourth ring gear R4.

In a forward sixth speed D6, the second brake B2 operated in the forward fifth speed D5 is released and the second clutch CL2 is operated. In this case, the torque transferred through the second planetary carrier PC2 from the input shaft 10 is transferred to the third sun gear S3 and is then transferred via the second ring gear R2 to the fourth sun gear S4. Consequently, a sixth speed line L6 is defined and a gear ratio of the sixth speed D6 is transferred to the output shaft 20 through the fourth ring gear R4.

In a forward seventh speed D7, the second clutch CL2 operated in the forward sixth speed D6 is released and the first brake B1 is operated. In this case, since the first and second sun gears S1 and S2 are operated as fixed elements by the first brake B1, the torque transferred through the second planetary carrier PC2 from the input shaft 10 is transferred to the third sun gear S3 through the third clutch CL3 and at the same time the torque increased through the second ring gear R2 is input to the fourth sun gear S4 through the first clutch CL1. Consequently, a seventh speed line L7 is defined and a gear ratio of the seventh speed D7 is transferred to the output shaft 20 through the fourth ring gear R4.

In a forward eighth speed D8, the third clutch CL3 operated in the forward seventh speed D7 is released and the second clutch CL2 is operated. In this case, since the first and second sun gears S1 and S2 are operated as fixed elements by the first brake B1, the torque transferred through the second planetary carrier PC2 from the input shaft 10 is increased through the second ring gear R2 to be transferred to the third and fourth sun gears S3 and S4. Consequently, an eighth speed line L8 is defined and the torque of the eighth speed D8 is transferred to the output shaft 20 through the fourth ring gear R4.

Meanwhile, in a reverse speed Rev, the first clutch CL1, the first brake B1, and the second brake B2 are operated. In this case, since the first sun gear S1 and the first ring gear R1 are fixed by the first brake B1 and the second brake B2, all elements of the first planetary gear set PG1 are fixed. In addition, both of the fourth planetary carrier PC4 connected to the first planetary carrier PC1 and the third ring gear R3 are fixed, and the second ring gear R2 is connected to the third planetary carrier PC3 and the fourth sun gear S4 by the first clutch CL1 through the second sun gear S2 as a fixed element. Therefore, a reverse speed line Rs is defined through the fourth ring gear R4 operated as an output element of the fourth planetary gear set PG4, and the torque of the reverse speed Rev is transferred to the output shaft 20.

Figure 4:
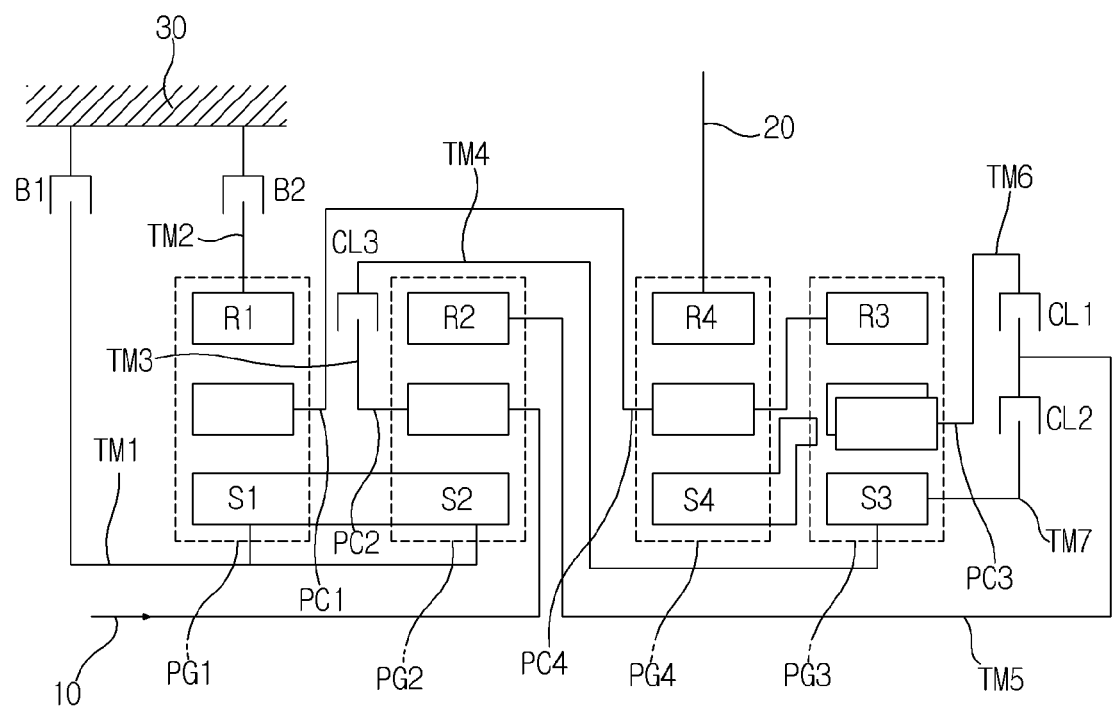
FIG. 4 is a diagram illustrating a configuration of an eight-speed powertrain of a vehicle automatic transmission according to another embodiment of the present invention.

FIG. 4 is a diagram illustrating a configuration of an eight-speed powertrain of a vehicle automatic transmission according to another embodiment of the present invention.

As described above, the first sun gear S1 rotates integrally with the second sun gear S2, and the fourth sun gear S4 rotates integrally with the third planetary carrier PC3. That is, both of the first sun gear S1 and the second sun gear S2 and both of the fourth sun gear S4 and the third planetary carrier PC3 may also be configured to always rotate together with each other using a separate connection member interconnecting the first sun gear S1 and the second sun gear S2 and a separate connection member interconnecting the fourth sun gear S4 and the third planetary carrier PC3, respectively, as illustrated in FIG. 1. However, the first sun gear S1 and the second sun gear S2 may be formed as a single integral member and the fourth sun gear S4 and the third planetary carrier PC3 may be formed as a single integral member, as illustrated in FIG. 4, with the consequence that it may be possible to reduce the number of components of the transmission and simplify the structure of the transmission.

Although not illustrated in FIG. 4, similarly to the above case, the fourth planetary carrier PC4 and the third ring gear R3 configured to rotate together with each other may be formed as a single integral member, and the third planetary carrier PC3 and the first planetary carrier PC1 configured to rotate together with each other may be formed as a single integral member.

Various embodiments have been described in the best mode for carrying out the invention. It will be understood by those skilled in the art that the above-mentioned technical configurations of the present invention may be realized in any suitable manner without departing from the spirit and scope of the invention as defined by the appended claims.

Although the present invention has been described with respect to the illustrative embodiments, it will be apparent to those skilled in the art that various variations and modifications may be made without departing from the spirit and scope of the invention as defined in the following claims.

The invention claimed is:

1. An eight-speed powertrain of a vehicle automatic transmission, comprising:
a first planetary gear set comprising a first sun gear, a first planetary carrier, and a first ring gear;
a second planetary gear set comprising a second sun gear, a second planetary carrier, and a second ring gear;
a third planetary gear set comprising a third sun gear, a third planetary carrier, and a third ring gear;
a fourth planetary gear set comprising a fourth sun gear, a fourth planetary carrier, and a fourth ring gear;
an input shaft connected to the second planetary carrier while power of a vehicle engine is input to the input shaft;
an output shaft connected to the fourth ring gear while varied torque is output from the output shaft;
a first rotary shaft connected to the first and second sun gears and at the same time selectively connected to a transmission case;
a second rotary shaft connected to the first ring gear and at the same time selectively connected to the transmission case;
a third rotary shaft connected to the second planetary carrier;
a fourth rotary shaft connected to the third sun gear and at the same time selectively connected to the third rotary shaft;
a fifth rotary shaft connected to the second ring gear;
a sixth rotary shaft connected to the third planetary carrier and at the same time selectively connected to the fifth rotary shaft;
a seventh rotary shaft connected to the third sun gear and at the same time selectively connected to the fifth rotary shaft;
a plurality of brakes selectively connecting the first rotary shaft to the transmission case and the second rotary shaft to the transmission case, respectively; and
a plurality of clutches selectively connecting the third and fourth rotary shafts, the fifth and sixth rotary shafts, and the fifth and seventh rotary shafts, respectively,
wherein at least one of the clutches is spatially spaced apart from another clutch, so that the second, third, and fourth planetary gear sets are provided within a space between the at least one clutch and the other clutch.

2. The eight-speed powertrain according to claim 1, wherein the first, second, third, and fourth planetary gear sets are arranged in order of the first planetary gear set, the second planetary gear set, the fourth planetary gear set, and the third planetary gear set.

3. The eight-speed powertrain according to claim 2, wherein the clutches comprises a first clutch selectively connecting the fifth and sixth rotary shafts, a second clutch selectively connecting the fifth and seventh rotary shafts, and a third clutch selectively connecting the third and fourth rotary shafts, and the at least one clutch is the third clutch.

4. The eight-speed powertrain according to claim 3, wherein the first and second clutches are spatially arranged in the rear of the third planetary gear set, and the third clutch is spatially arranged between the first and second planetary gear sets.

5. The eight-speed powertrain according to claim 1, wherein the first sun gear rotates integrally with the second sun gear.

6. The eight-speed powertrain according to claim 5, wherein the first and second sun gears are formed as a single integral member.

7. The eight-speed powertrain according to claim 1, wherein the third ring gear rotates integrally with the fourth planetary carrier.

8. The eight-speed powertrain according to claim 7, wherein the third ring gear and the fourth planetary carrier are formed as a single integral member.

9. The eight-speed powertrain according to claim 1, wherein the third planetary carrier rotates integrally with the fourth sun gear.

10. The eight-speed powertrain according to claim 9, wherein the third planetary carrier and the fourth sun gear are formed as a single integral member.

11. The eight-speed powertrain according to claim 1, wherein the first planetary carrier rotates integrally with the fourth planetary carrier.

12. The eight-speed powertrain according to claim 11, wherein the first planetary carrier and the fourth planetary carrier are formed as a single integral member.

13. The eight-speed powertrain according to claim 1, wherein the third planetary gear set has a double pinion structure.

* * * * *